United States Patent
Wei et al.

(10) Patent No.: US 9,523,183 B2
(45) Date of Patent: Dec. 20, 2016

(54) SYSTEM AND METHOD FOR OPTIMIZING A REVERSING OPERATION

(71) Applicant: Caterpillar Inc., Peoria, IL (US)

(72) Inventors: Mo Wei, Dunlap, IL (US); Michael Taylor, Swissvale, PA (US); Thandava K. Edara, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 80 days.

(21) Appl. No.: 14/557,052

(22) Filed: Dec. 1, 2014

(65) Prior Publication Data

US 2016/0153175 A1 Jun. 2, 2016

(51) Int. Cl.
*G06F 7/70* (2006.01)
*E02F 9/20* (2006.01)
*F16H 61/02* (2006.01)
*F16H 59/44* (2006.01)
*F16H 59/36* (2006.01)
*F16H 59/66* (2006.01)

(52) U.S. Cl.
CPC ......... *E02F 9/2025* (2013.01); *F16H 61/0204* (2013.01); *F16H 61/0246* (2013.01); *F16H 59/44* (2013.01); *F16H 2059/366* (2013.01); *F16H 2059/663* (2013.01); *F16H 2059/666* (2013.01)

(58) Field of Classification Search
USPC .......................................................... 701/50
See application file for complete search history.

(56) References Cited

U.S. PATENT DOCUMENTS

| | | | |
|---|---|---|---|
| 4,648,291 A | 3/1987 | Klatt et al. | |
| 5,257,193 A | 10/1993 | Kusaka et al. | |
| 6,070,118 A * | 5/2000 | Ohta | B60K 31/0066 477/97 |
| 7,970,522 B2 | 6/2011 | Tsukada et al. | |
| 2004/0167705 A1 | 8/2004 | Lingman et al. | |
| 2006/0069488 A1 | 3/2006 | Sychra et al. | |
| 2007/0181361 A1* | 8/2007 | Stratton | E02F 3/847 180/315 |
| 2012/0143449 A1* | 6/2012 | Chauncey | B60W 40/09 701/51 |
| 2013/0173124 A1 | 7/2013 | Palmer | |
| 2013/0245896 A1* | 9/2013 | Velde | G06F 17/00 701/50 |
| 2014/0095036 A1* | 4/2014 | Hoff | E02F 3/342 701/65 |
| 2014/0121058 A1* | 5/2014 | Nackers | B60W 10/103 477/43 |
| 2014/0214295 A1 | 7/2014 | Elliott | |
| 2014/0257656 A1* | 9/2014 | Schwartz | B60T 7/12 701/61 |

* cited by examiner

*Primary Examiner* — Hussein A. Elchanti
(74) *Attorney, Agent, or Firm* — Leydig, Voit & Mayer, Ltd.

(57) ABSTRACT

A system for determining optimized shift locations of a transmission of a machine as the machine moves along a work surface includes a position sensor, a transmission having a low gear and a high gear, and a controller including a machine controller. The controller is configured to determine the position of the work surface, store a shift threshold, and control shifting between the low gear and the high gear based upon the position of the work surface and the shift threshold. The machine controller is configured to control shifting between the low gear and the high gear based upon operating parameters of the machine.

20 Claims, 6 Drawing Sheets

SYSTEM AND METHOD FOR OPTIMIZING A REVERSING OPERATION

TECHNICAL FIELD

This disclosure relates generally to controlling a machine and, more particularly, to a system and method for planning shifting operations of a machine to optimize a material moving operation and/or reduce wear on the machine.

BACKGROUND

Machines such as dozers, motor graders, wheel loaders, etc., are used to perform a variety of tasks. For example, these machines may be used to move material at a work site. The machines may operate in an autonomous or semi-autonomous manner to perform these tasks in response to commands generated as part of a work plan for the machines. The machines may receive instructions in accordance with the work plan to perform operations including digging, loosening, carrying, etc., different materials at the work site such as those related to mining, earthmoving and other industrial activities.

Autonomously operated machines may remain consistently productive without regard to a human operator or environmental conditions. In addition, autonomous systems may permit operation in environments that are unsuitable or undesirable for a human operator. Autonomous or semi-autonomous systems may also compensate for inexperienced human operators as well as inefficiencies associated with repetitive tasks.

After performing a material moving operation, it is often desirable to operate a machine in reverse to position the machine in a location to begin a new material moving operation. When operating in reverse, the transmission of the machine may shift based upon the current operating characteristics of the machine. If the profile of the work surface varies significantly, the transmission may shift frequently or undergo "flash gear switching" as the machine climbs and descends hills along the work surface. Frequent gear shifting may increase the temperature of the transmission which may increase wear on the transmission.

Movement of machines and their associated work implements are often developed by a planning system or module. A plurality of variables may affect the planning system and impact the efficiency of the machine operation. It is often desirable to ensure that the machines perform the material movement operations such that the materials are moved in an efficient manner. For example, it may be desirable to ensure that the locations at which the machines begin to alter the work surface, and/or the profiles along which the machines alter the work surface, are chosen such that the machines function efficiently.

PCT Patent Publication No. 2008/0118027 discloses a method of contour shaping by a machine equipped with a cutting implement. The method includes providing a desired topographical plan, measuring the real time position of at least one of the machine and the cutting implement, generating instructions to move the cutting implement, plotting a transitional path from the real time position of the machine or the cutting implement to a point on the desired topographical plan, and using the transitional path and the real time position of the machine or the cutting implement to generate the instructions to move the cutting implement.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a system for determining optimized shift locations of a transmission of a machine as the machine moves on a work surface includes a position sensor for generating position signals indicative of a position of the work surface, a transmission having a low gear and a high gear, and a controller including a machine controller. The controller is configured to receive the position signals, determine the position of the work surface based upon the position signals, store a shift threshold, and control shifting between the low gear and the high gear based upon the position of the work surface and the shift threshold. The machine controller is configured to control shifting between the low gear and the high gear based upon operating parameters of the machine.

In another aspect, a controller-implemented method of shifting between a low gear and a high gear of a transmission of a machine while the machine is moving includes receiving position signals indicative of a position of the work surface from a position sensor and determining the position of the work surface based upon the position signals. The method further includes storing a shift threshold and shifting between the low gear and the high gear based upon the position of the work surface and the shift threshold.

In still another aspect, a machine includes a prime mover, a ground-engaging drive mechanism operatively connected to the prime mover for propelling the machine along a work surface, a position sensor for generating position signals indicative of a position of the work surface, and a transmission having a low gear and a high gear. A controller includes a machine controller and is configured to receive the position signals, determine the position of the work surface based upon the position signals, store a shift threshold, and control shifting between the low gear and the high gear based upon the position of the work surface and the shift threshold. The machine controller is configured to control shifting between the low gear and the high gear based upon operating parameters of the machine.

DETAILED DESCRIPTION

Figure 1:
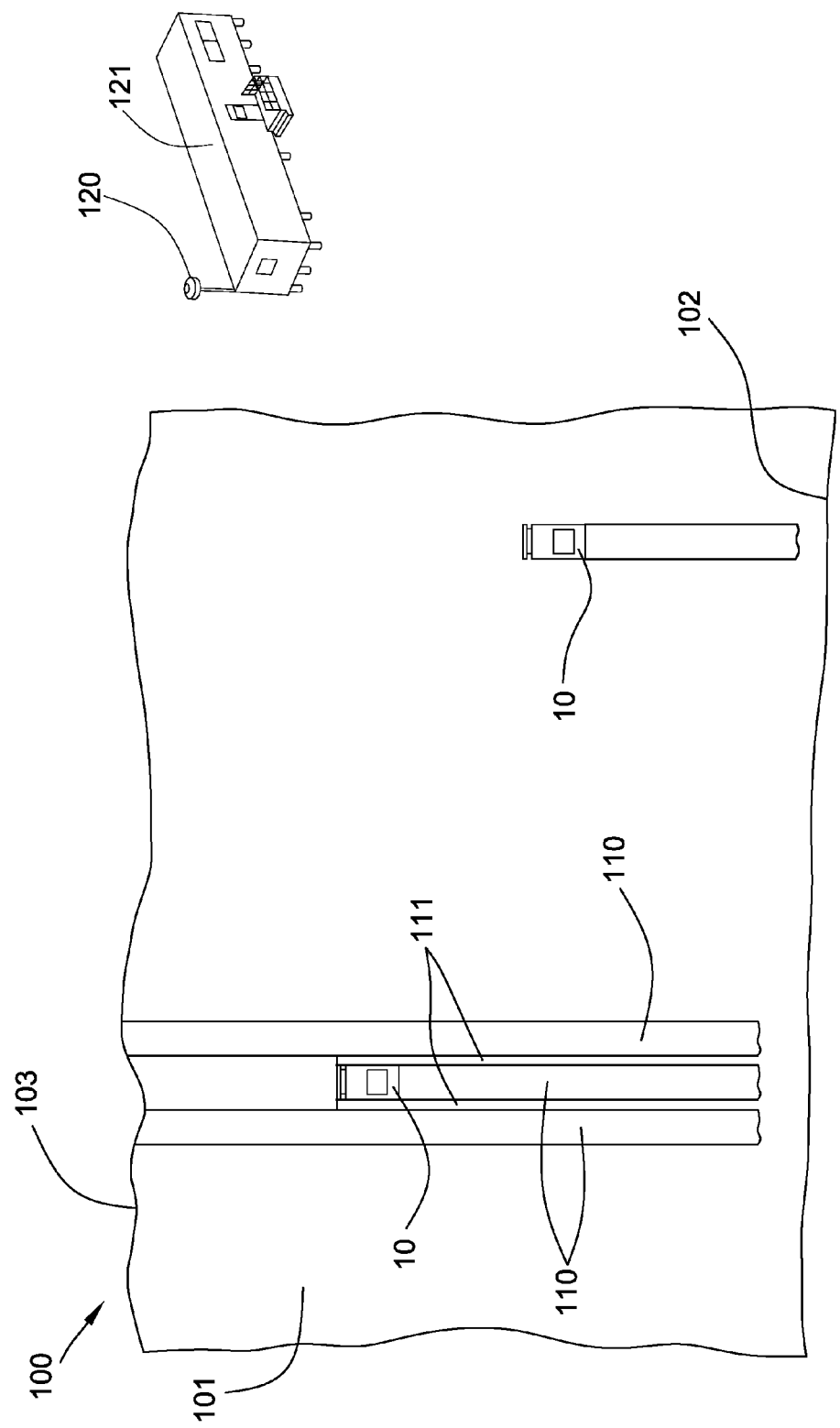
FIG. 1 depicts a schematic view of a work site at which a machine incorporating the principles disclosed herein may be used.

FIG. 1 depicts a diagrammatic illustration of a work site 100 at which one or more machines 10 may operate in an autonomous, a semi-autonomous, or a manual manner. Work site 100 may be a portion of a mining site, a landfill, a quarry, a construction site, or any other area in which movement of material is desired. Tasks associated with moving material may include a dozing operation, a grading operation, a leveling operation, a bulk material removal operation, or any other type of operation that results in the alteration of the existing topography at work site 100. As depicted, work site 100 includes a work area 101 having a high wall 102 at one end and a crest 103 such as an edge of a ridge, embankment, or other change in elevation at an opposite end. Material is moved generally from the high wall 102 towards the crest 103. The work surface 104 of the work area 101 may take any form and refers to the actual profile or position of the terrain of the work area.

Machine 10 may be configured to move material at the work site 100 according to one or more material movement plans from an initial location such as near the high wall 102 to a spread or dump location such as at crest 103. The material movement plans may include, among other things, forming a plurality of spaced apart channels or slots 110 that are cut into the work surface 104 at work site 100 along a path generally from the high wall 102 to the crest 103. In doing so, each machine 10 may move back and forth along a path generally between the high wall 102 and the crest 103.

As used herein, a machine 10 operating in an autonomous manner operates automatically based upon information received from various sensors without the need for human operator input. As an example, a haul or load truck that automatically follows a path from one location to another and dumps a load at an end point may be operating autonomously. A machine operating semi-autonomously includes an operator, either within the machine or remotely, who performs some tasks or provides some input and other tasks are performed automatically and may be based upon information received from various sensors. As an example, a load truck that automatically follows a path from one location to another but relies upon an operator command to dump a load may be operating semi-autonomously. In another example of a semi-autonomous operation, an operator may dump a bucket of an excavator in a load truck and a controller may automatically return the bucket to a position to perform another digging operation. A machine being operated manually is one in which an operator is controlling all or essentially all of the functions of the machine. A machine may be operated remotely by an operator (i.e., remote control) in either a manual or semi-autonomous manner.

Figure 2:
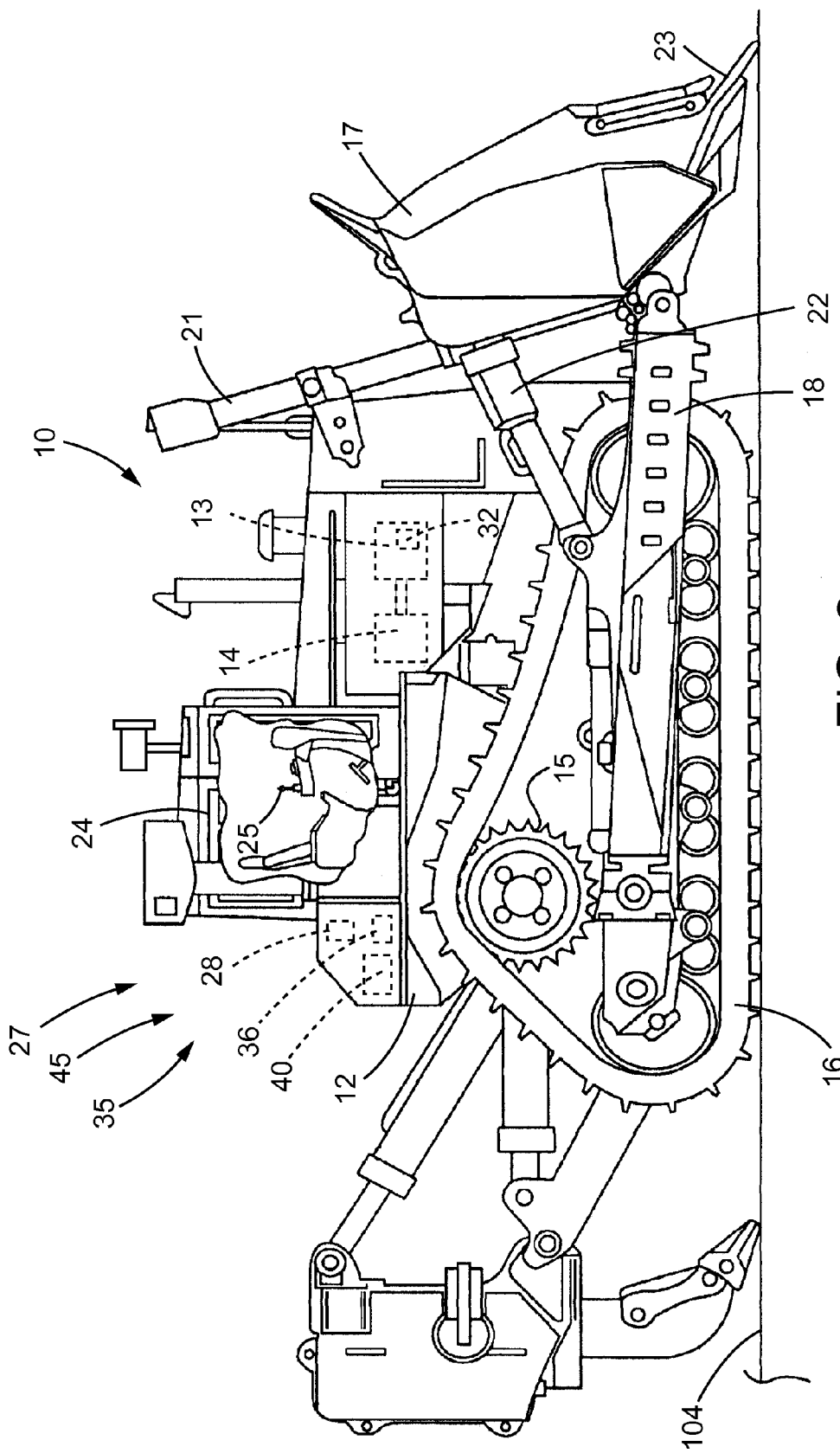
FIG. 2 depicts a diagrammatic illustration of a machine in accordance with the disclosure.

FIG. 2 depicts a diagrammatic illustration of a machine 10 such as a dozer with a ground engaging work implement such as a blade 17 configured to push material. The machine 10 includes a frame 12 and a prime mover such as an engine 13 that is operatively connected to a transmission 14. The transmission 14 may be operatively connected to drive sprockets 15 that engage and drive a ground-engaging drive mechanism such as a track 16 on opposite sides of machine 10 to propel the machine. Although machine 10 is shown in a "track-type" configuration, other configurations, such as a wheeled configuration, may be used. Operation of the engine 13 and the transmission 14 may be controlled by a control system 35 including a controller 36. The systems and methods of the disclosure may be used with any machine propulsion and drivetrain mechanisms applicable in the art for causing movement of the machine including hydrostatic, electric, or mechanical drives.

Transmission 14 may include a plurality of intermeshing gears (not shown) that may be selectively engaged to establish a series of speed ratios between the engine 13 and an output shaft (not shown) of the transmission 14 to transmit torque at a desired speed to drive machine 10. The transmission 14 also includes a forward gear and a reverse gear that permit the machine to operate in forward and reverse directions. The different speed ratios of the transmission 14 permit the machine 10 to be operated in different gears, with each having a different gear ratio. For example, transmission 14 may include a first gear for use while moving material 105 or climbing a relatively steep slope, and one or more higher gears for use on less steep or flatter work surfaces 104.

Blade 17 may be pivotally connected to frame 12 by arms 18 on each side of machine 10. First hydraulic cylinder 21 coupled to frame 12 supports blade 17 in the vertical direction and allows blade 17 to move up or down vertically from the point of view of FIG. 2. Second hydraulic cylinders 22 on each side of machine 10 allow the pitch angle of blade tip 23 to change relative to a centerline of the machine.

Machine 10 may include a cab 24 that an operator may physically occupy and provide input to control the machine. Cab 24 may include one or more input devices such as joystick 25 through which the operator may issue commands to control the propulsion system and steering system of the machine as well as operate various implements associated with the machine.

Machine 10 may be controlled by a control system 35 as shown generally by an arrow in FIG. 2 indicating association with the machine 10. The control system 35 may include an electronic control module or controller 36 and a plurality of sensors. The controller 36 may receive input signals from an operator operating the machine 10 from within cab 24 or off-board the machine through a wireless communications system 120 (FIG. 1). The controller 36 may control the operation of various aspects of the machine 10 including the drivetrain and the hydraulic systems.

The controller 36 may be an electronic controller that operates in a logical fashion to perform operations, execute control algorithms, store and retrieve data and other desired operations. The controller 36 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 36 such as power supply circuitry, signal conditioning circuitry, driver circuitry, and other types of circuitry.

The controller 36 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the controller 36 may be implemented in hardware and/or software without regard to the functionality. The controller 36 may rely on one or more data maps relating to the operating conditions and the operating environment of the machine 10 and the work site 100 that may be stored in the memory of controller. Each of these data maps may include a collection of data in the form of tables, graphs, and/or equations.

The control system 35 and the controller 36 may be located on the machine 10 and may also include components located remotely from the machine such as at a command center 121 (FIG. 1). The functionality of control system 35 may be distributed so that certain functions are performed at machine 10 and other functions are performed remotely. In such case, the control system 35 may include a communications system such as wireless communications system 120 for transmitting signals between the machine 10 and a system located remote from the machine.

Controller 36 may include an on-board component such as machine controller 40. The machine controller 40 may be configured to control certain fundamental aspects or properties of the machine 10. In one aspect, the machine controller 40 may be configured to control shifting of the transmission 14 between gears based upon the operating parameters of the machine. For example, the machine controller 40 may monitor the speed of the engine 13, the speed of the machine 10, and the gear in which the machine is operating, and shift the transmission 14 based upon the operating characteristics encountered by the machine. Other operating parameters of the machine may be monitored and used by the machine controller 40 to control shifting of the transmission 14. Regardless of the configuration, the machine controller 40 may be configured to monitor the current operating parameters of various aspects of the machine and either maintain the transmission in its current gear or shift to a higher or lower gear based upon those operating parameters.

In some situations, the standard shifting parameters of transmission 14 may be changed or overridden by other aspects of the control system 35. For example, instructions may be provided to maintain the transmission 14 in first or low gear during reverse operation of the machine 10. Still further, an additional or secondary system may be configured to provide instructions that cause the transmission 14 to shift in addition to or despite instructions from the machine controller 40. However, the machine controller 40 and the secondary system may be configured to control the operation of the transmission 14 so that certain aspects of the machine operation will take priority and occur regardless of instructions from the secondary system. For example, if the secondary system is providing instructions that would result in maintaining the transmission 14 in second or high gear and the machine speed slows relative to that which is expected based upon the engine speed and gearing, instructions from the machine controller 40 may override the secondary system and provide instructions to shift the transmission to first or a low gear. In the absence of such prioritization between the machine controller 40 and the secondary system, the machine 10 may become stuck or otherwise operate inefficiently.

Machine 10 may be configured to be operated autonomously, semi-autonomously, or manually. When operating semi-autonomously or manually, the machine 10 may be operated by remote control and/or by an operator physically located within the cab 24.

Machine 10 may be equipped with a plurality of machine sensors 26, as shown generally by an arrow in FIG. 2 indicating association with the machine 10, that provide data indicative (directly or indirectly) of various operating parameters of the machine and/or the operating environment in which the machine is operating. The term "sensor" is meant to be used in its broadest sense to include one or more sensors and related components that may be associated with the machine 10 and that may cooperate to sense various functions, operations, and operating characteristics or parameters of the machine and/or aspects of the environment in which the machine is operating.

A position sensing system 27, as shown generally by an arrow in FIG. 2 indicating association with the machine 10, may include a position sensor 28, also shown generally by an arrow in FIG. 2 to indicate association with the machine, to sense the position and orientation (i.e., the heading, pitch, roll or tilt, and yaw) of the machine relative to the work site 100. The position and orientation of the machine 10 are sometimes collectively referred to as the position of the machine. The position sensor 28 may include a plurality of individual sensors that cooperate to generate and provide position signals to controller 36 indicative of the position and orientation of the machine 10. In one example, the position sensor 28 may include one or more sensors that interact with a positioning system such as a global navigation satellite system or a global positioning system to operate as a position sensor. In another example, the position sensor 28 may further include a slope or inclination sensor such as pitch angle sensor for measuring the slope or inclination of the machine 10 relative to a ground or earth reference. The controller 36 may use position signals from the position sensors 28 to determine the position of the machine 10 within work site 100. In other examples, the position sensor 28 may include an odometer or another wheel rotation sensing sensor, a perception based system, or may use other systems such as lasers, sonar, or radar to determine all or some aspects of the position of machine 10.

In some instances, the position sensing system 27 may be located off-board the machine 10. For example, a separate mapping system or machine (not shown) may be used to analyze or determine the position of the work surface 104. In some embodiments, the position sensing system 27 may include a separate orientation sensing system. In other words, a position sensing system may be provided for determining the position of the machine 10 and a separate orientation sensing system may be provided for determining the orientation of the machine.

If desired, the position sensing system 27 may also be used to determine a ground speed of machine 10. Other sensors or a dedicated machine speed sensor may alternatively be used to determine the ground speed of the machine 10. Such a machine speed sensor may generate machine speed signals indicative of the ground or machine speed. An engine speed sensor 32 may be operatively associated with engine 13 and utilized to generate a signal indicative of the speed or output of the engine 13.

Machine 10 may be configured to move material 105 at the work site 100 according to one or more material movement plans from an initial location such as near high wall 102 to a spread or dump location 108. The dump location 108 may be at crest 103 or at any other location. The material movement plans may include, among other things, forming a plurality of spaced apart channels or slots 110 that are cut into the work surface 104 at work site 100 along a path from the initial location to the dump location. In doing so, each machine 10 may move back and forth along a path between the initial location and the dump location. If desired, a relatively small amount of material may be left or built up as walls 111 between adjacent slots 110 to prevent or reduce spillage and increase the efficiency of the material moving process. The walls 111 between the slots 110 may be moved after the slots are formed or periodically as desired. The process of moving material through slots 110 while utilizing walls 111 of material to increase the efficiency of the process is sometime referred to as "slot dozing."

After each pass, the controller 36 may direct the machine 10 to back up or operate in reverse to move uphill from the dump location 108 back towards the high wall 102 to position the machine to begin a new cut at a new cut location. As used herein, the word "uphill" refers to a direction towards the high wall 102 relative to the crest 103 or dump location 108. Similarly, the word "downhill" refers to a direction towards the crest 103 or dump location 108 relative to the high wall 102.

Figure 3:
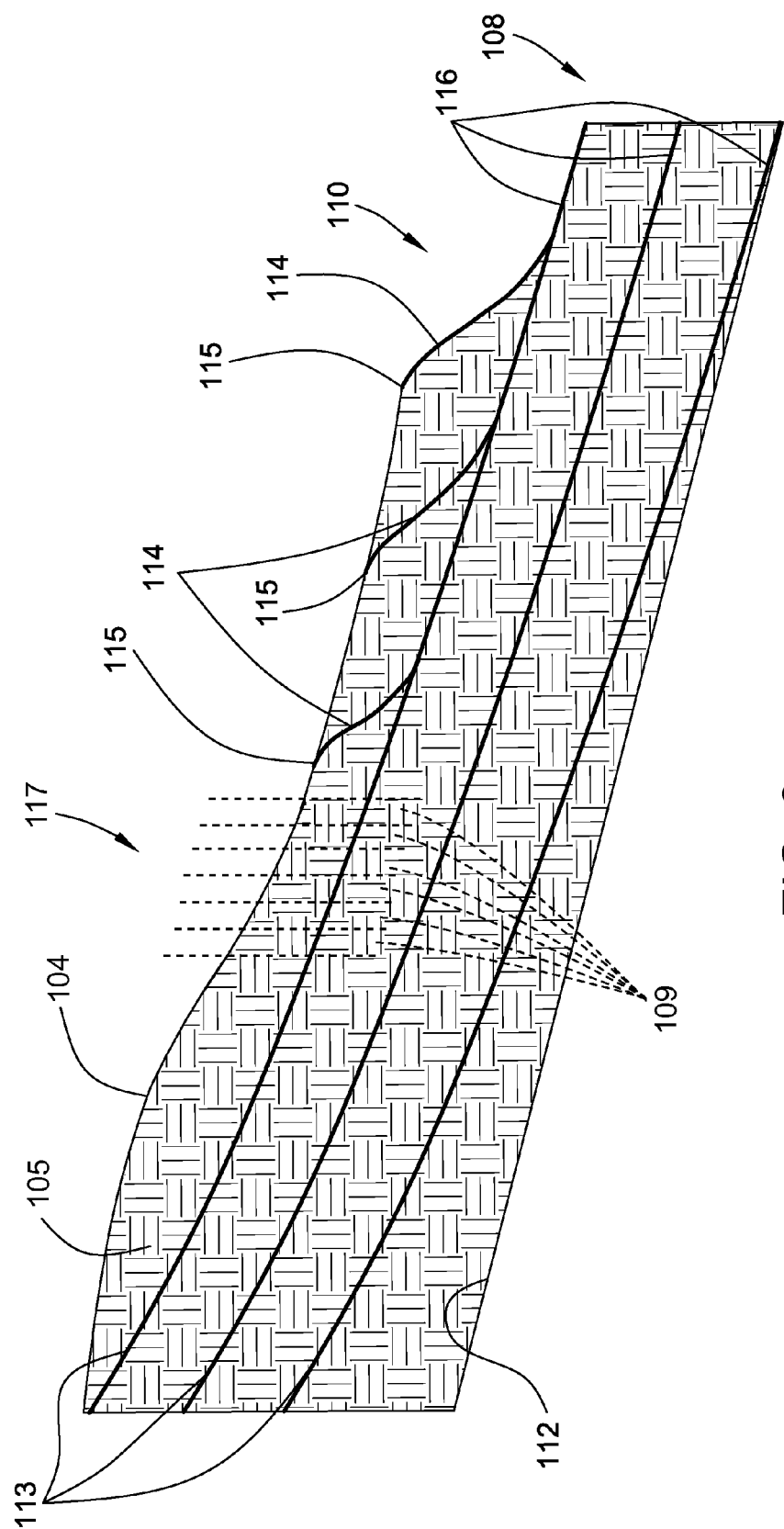
FIG. 3 depicts a cross-section of a portion of a work site depicting various aspects of a material moving plan.

Work surface 104 represents the uppermost height of the existing material 105 along a slot 110. While FIG. 3 is depicted in two-dimensions, it should be appreciated that the data representing the illustration may be in three-dimensions. The path 117 along slot 110 may be divided into a plurality of increments 109 and data stored within controller 36 for each increment. The controller 36 may store information or characteristics of each increment 109 such as the length of the work surface 104 and its angular orientation relative to a ground reference, the material characteristics of the material 105 beneath the work surface, a time stamp or indicator of the age of the data, and any other desired information. The information regarding each path 117 may be stored within an electronic map within controller 36 as part of a topographical map of the work site 100.

Information regarding each path 117 may be obtained according to any desired method. In one example, the machine 10 may utilize the position sensing system 27 described above to map out the contour of work surface 104 as machine 10 moves across it. This data may also be obtained according to other methods such as by a vehicle or device that includes lasers and/or cameras. It's be noted that as the machine 10 moves material 105 to the dump location 108, the position of the work surface 104 will change and may be updated based upon the current position of the machine and the position of the blade 17.

Control system 35 may include a module or planning system 45 for determining or planning various aspects of the operation of the machine 10 as it moves about the work site 100. The planning system 45 may receive and store various types of input such as the configuration of the work surface 104 and characteristics of the material that makes up the work surface. Operating characteristics and capabilities of the machine 10 may also be entered into the planning system 45. Planning system 45 may be used to optimize cut locations 115 and the paths or cuts 114 that the blade 17 follows as the machine 10 travels along path 117 between high wall 102 and dump location 108.

In addition, the planning system 45 may be used to optimize other aspects of the operation of the machine. For example, the planning system 45 may be configured to optimize the operation of the machine 10 as it moves uphill from dump location 108 towards high wall 102 as it is positioned to perform the next material moving operation. In some instances, to avoid flash gear switching, the controller 36 may maintain the transmission 14 in low gear while moving uphill. However, moving the machine 10 uphill along the entire path 117 in first gear may be relatively inefficient as it may increase the travel time and fuel usage of the machine 10.

In order to avoid flash gear switching while improving the efficiency of operation, the planning system 45 may be configured to evaluate the slope of path 117 and anticipate shifts of the transmission 14 from the machine controller 40 and provide instructions to the transmission prior to or instead of those directed by the machine controller. To do so, the planning system 45 may utilize the maximum incline or angle of inclination that the machine 10 may climb while operating in second or high gear while in reverse to plan shifts based upon the profile of the work surface 104 along path 117. Using the profile of the work surface 104 to plan shifts of the transmission 14 results in anticipatory shifting rather than the reactive shifting that occurs through the operation of machine controller 40. As a result, the efficiency of moving the machine 10 uphill in reverse (or downhill in forward) may be increased while reducing or eliminating shifting instructions from the machine controller 40 and flash gear switching.

The planning system 45 may be part of the controller 36 and, in one embodiment perform the planning operations while operating the machine 10. In another embodiment, the calculations may be performed ahead of time and the various inputs to the planning system 45 and the resultant shift locations stored as part of the data maps of the controller 36. In such case, upon setting the desired inputs and determining the configuration of the work surface 104, desired or acceptable shift locations may be determined by the controller 36 through the use of its data maps. In some instances, the planning system 45 may be part of a secondary controller that forms a part of controller 36. The secondary controller may be located on-board or off-board the machine 10.

Figure 4:
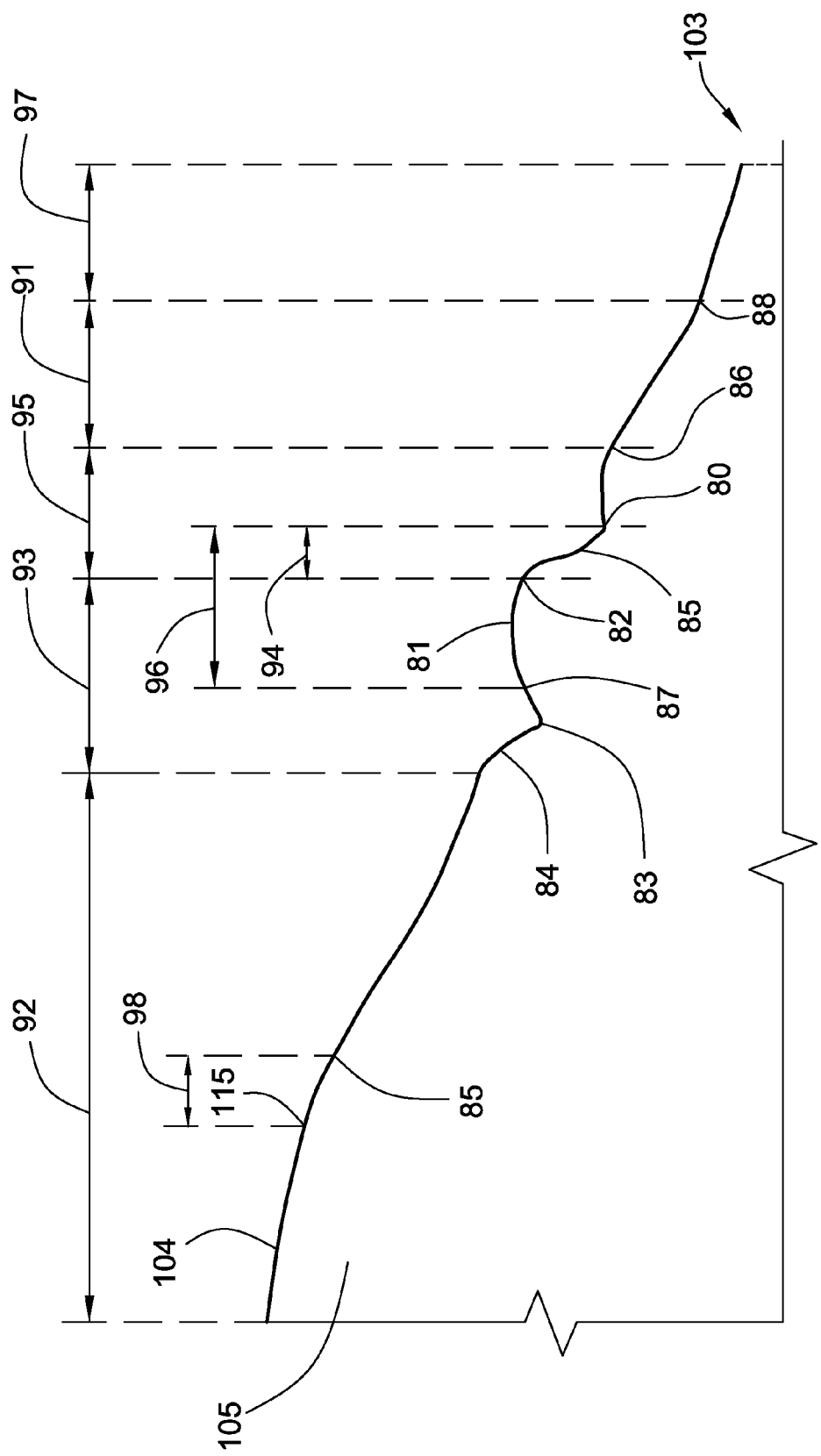
FIG. 4 depicts a cross-section of a portion of a work site depicting an aspect of the movement optimization process in accordance with the disclosure.

Referring to FIG. 4, a potential work surface 104 along a path 117 at work site 100 is illustrated. The planning system 45 may be operative to simulate movement of the machine 10 along the work surface 104 and, in particular, movement of the machine rearward or uphill from the crest 103 or dump location 108 towards the high wall 102.

The planning system 45 may analyze increments 109 of the work surface 104 along path 117 to determine whether the machine 10 may move uphill along the work surface 104 in high gear or whether the machine would need to be in low gear. In doing so, the planning system 45 may analyze the characteristics of the work surface 104 (i.e., the angle of each increment 109 relative to a ground reference and the material characteristics of material 105 beneath the work surface) together with the capabilities of the machine 10 to determine when the machine controller 40 would likely shift between low gear and high gear based upon the characteristics of the work surface 104 encountered by the machine. As used herein, shifting between low gear and high gear means shifting from one gear to the other regardless of direction unless the context clearly indicates otherwise. This may be contrasted by references to shifting in a particular direction from one gear to the other in a specific order (i.e., upshifting or downshifting).

Under some conditions, the terrain or position of the work surface 104 may cause the machine controller 40 to shift the transmission 14 between low gear and high gear and then back relatively frequently. For example, referring to FIG. 4, the machine controller 40 may shift the transmission 14 from high gear to low gear at location 80 as the machine begins to climb the hill 81 and then shift back to high gear at location 82 as the machine passes the peak of the hill. Such relatively rapid shifting of the transmission 14 or flash gear switching may create excessive heat which may cause excessive wear within or otherwise damage the transmission.

To reduce the likelihood of flash gear switching, the planning system 45 may be configured to analyze the profile of the work surface 104 along path 117 and generate a shifting pattern for the transmission 14 that will avoid flash gear switching. In other words, rather than rely upon the machine controller 40 which relies upon the operating conditions encountered by the machine to reactively shift gears, the planning system 45 may be configured to proactively generate a shifting pattern that will avoid flash gear switching.

The planning system 45 may be configured with or store shift thresholds that establish a minimum distance that the machine 10 must travel or a minimum time period that must elapse before the transmission 14 will perform a second shifting operation after the transmission has performed a first shifting operation. In other words, the shift thresholds may specify the distance traveled or time elapsed between two shifts of the transmission 14.

The controller 36 may be configured to prioritize shifts commanded by the machine controller 40 from high gear to low gear over those commanded by planning system 45. In all other instances, the controller 36 may be configured to follow the shifts generated by the planning system 45. As a result, the transmission 14 may be shifted according to a plan developed by the planning system 45 provided that the shifting plan does not conflict with shifts from high gear to low gear as commanded by the machine controller 40. In other words, the controller 36 may shift the transmission according to the shifting plan generated by planning system 45 except when the machine controller 40 is commanding a downshift from high gear to low gear such as due to the machine encountering a relatively steep slope.

The planning system 45 may operate by analyzing a segment made up of a predetermined number of increments 109 uphill from the position of the machine 10 to determine what shifts in the transmission 14 would be commanded by the machine controller 40 if the machine 10 were operated without the planning system 45. The length of each analysis segment being analyzed may be based upon the shift thresholds. Accordingly, in one embodiment, the segment length may be set according to the distance the machine 10 should travel to satisfy or meet the shift threshold if it is defined or set in terms of a distance. If the shift threshold is set according to a specified time between shifts, the length of each analysis segment may be based upon the anticipated speed of the machine 10 and the time that must pass to meet the shift threshold.

The planning system 45 may analyze the angular orientation and material characteristics of each increment 109 relative to the capabilities of the machine 10 for each gear of transmission 14. In one example, the threshold angle or maximum slope a machine 10 may be capable of climbing in second gear while traveling in reverse may be 25°.

Using the threshold angle for a particular machine 10, the planning system 45 may determine whether the angle of any of the increments 109 relative to a gravity reference is greater than the threshold angle. If the angle of each increment 109 is less than the threshold angle, the machine 10 is unlikely to encounter conditions that will cause the machine controller 40 to shift the transmission 14 from high gear to low gear. Accordingly, the planning system 45 may designate the analysis segment as being traversable in high gear based upon the slopes of the increments 109 of the analysis segment. Referring to FIG. 4, portions 91 and 92 of path 117 are formed of a plurality of increments, none of which exceed the threshold angle. Accordingly, based upon the slope of the increments that make up each analysis segment, the planning system 45 may designate portions 91 and 92 of path 117 as lengths of the path that may be traversed in high gear while traveling in reverse. It should be noted that portions 91 and 92 may be formed of a plurality of analysis segments.

If one or more increments 109 of an analysis segment has an angle greater than the threshold angle, the planning system 45 may further analyze the analysis segment to determine the likelihood that the machine controller 40 will shift the transmission 14 from high gear to low gear. In doing so, the planning system 45 may analyze the number of increments 109 that exceed the threshold angle and the extent to which they exceed the angle. If a single increment 109 of an analysis segment exceeds the threshold angle, the planning system 45 may determine that the machine 10 may climb the analysis segment without a downshift command from the machine controller 40. This may, however, depend upon the angle of the single increment. If more than one increment 109 exceeds the threshold angle, the planning system 45 may be less likely to determine that the machine 10 may climb the analysis segment without a downshift command from the machine controller 40.

Referring to FIG. 4, it may be seen that portion 93 of path 117 that begins at location 82 moves downward to a valley 83 that then extends upward at slope 84. If the angle of slope 84 is not too large and/or the length of the slope is not too long, the machine 10 may be able to climb slope 84 without shifting from high gear to low gear even though the angle exceeds the threshold angle. In such case, the planning system 45 may designate portion 93 as an additional length of the path 117 that may be climbed in high gear while operating in reverse.

Referring to portion 94 of path 117 that begins at location 80 and travels up hill 81, it may be seen that the slope 85 is too steep to traverse in high gear. Accordingly, the machine controller 40 will likely command a downshift of the transmission 14 from high gear to low gear. However, since the portion 93 beginning at location 82 may be traversed in high gear, shifting commands from the machine controller 40 would result in a downshift at location 80 and an upshift at location 82. If the distance or time between these two shifts is too small, such shifting may result in flash gear switching.

To avoid flash gear switching, the planning system 45 may be configured to anticipate the shifting operations and designate or control the shifting operations to avoid flash gear switching. In one example, the planning system 45 may designate a downshift at a distance ahead or downhill of location 80 such as at location 86 even though the distance from location 86 to location 80 may be traversed in high gear. In doing so, the distance between or time for the machine 10 to travel between location 83 and location 82 (at which upshifting is desired) should exceed the shift threshold and thus avoid flash gear switching. In such case, the planning system 45 is configured to control both the downshifting and the upshifting operations. The portion along which the machine 10 would operate in low gear is identified at 95.

In another example, the planning system 45 may permit the machine controller 40 to downshift at location 80 and then maintain the transmission in low gear past location 82 (at which upshifting is desired) to a location 87 which corresponds a location at which the distance between or time for the machine 10 to travel between location 80 and location 87 exceeds the shift threshold and thus flash gear switching is avoided. The portion along which the machine 10 would operate in low gear is identified at 96.

In each of the examples, the planning system 45 may also consider the material characteristics (e.g., hardness, density, etc.) of the work surface 104 along the path 117. In general, the softer the material 105 upon which the machine 10 is traveling, the more likely the machine will be able to climb a slope larger than the threshold angle while remaining in high gear. For example, if one increment of an analysis segment exceeds the threshold angle and the material 105 is relatively soft, the machine 10 may compress the material to decrease the angle of the work surface 104.

In addition, other factors and characteristics of the machine 10 may be utilized by the planning system 45. For example, the planning system 45 may have stored therein desired thresholds for the lowest permitted RPM of the engine 13, a maximum permitted time for lugging, a minimum permitted speed in high gear, and any other desired factors or characteristics. The planning system 45 may monitor systems of the machine 10 to determine and further modify the shifting patterns based upon these factors and characteristics.

The characteristics of the increments 109 (e.g., number and angles of increments and material characteristics) and the gear required to traverse an analysis segment may be stored within a data map of controller 36. For example, a data map may specify the extent to which a single increment 109 may exceed the threshold angle taking into consideration different material characteristics of the work surface 104. Further, the data map may also specify the extent to which a plurality of increments 109 may exceed the threshold angle taking into consideration the different material characteristics of the work surface 104.

From the foregoing, it may be seen that the planning system 45 may analyze when the machine controller 40 is likely to shift the transmission 14 between low gear and high gear and generate a gear shifting plan to ensure that flash gear switching does not occur. To do so, the planning system 45 may identify instances in which flash gear switching may occur and generate a command to either shift the transmission into low gear before a shift is commanded by the machine controller 40 or by maintaining the transmission in low gear after a shift until the predetermined shift threshold has been met.

The planning system 45 may also control the shifting operation based upon other aspects of the operation of the machine 10. In some instances, the planning system 45 may be configured to maintain the transmission 14 in low gear until a reverse shift threshold has been met after shifting from forward to reverse. In one example, the reverse shift threshold may be set as a predetermined threshold distance that the machine 10 must move in reverse before the transmission 14 maybe shifted into high gear. In another example, the reverse shift threshold may be set as a predetermined time threshold that must pass or lapse before the transmission 14 maybe shifted into high gear. The portion along which the machine 10 would operate in low gear after shifting from forward to reverse is identified at 97 and extends from crest 103 to location 88.

The planning system 45 may also be configured to shift the transmission 14 into low gear a predetermined distance 98 or threshold before reaching a new cut location 115 at which the material moving process may begin again. More specifically, since the material moving process typically occurs with the transmission 14 in low gear, it may be desirable to shift the transmission 14 into low gear before shifting from reverse to forward. As a result, the planning system 45 may determine a cut location boundary 85 that establishes when the transmission 14 should be shifted into low gear. The cut location boundary 85 may be designated in terms of distance or time prior to reaching the new cut location 115. The planning system 45 may specify that the transmission 14 should be in low gear upon reaching the cut location boundary 85. In some instances, the planning system 45 may shift the transmission 14 from high gear to low gear at the cut location threshold.

In other instances, the cut location boundary 85 may prevent the planning system 45 from shifting from low gear to high gear at some location downhill from the cut location boundary. In other words, while an analysis of the topography of a segment may permit shifting of the transmission 14 from low gear to high gear, the planning system 45 may prevent such shifting because the machine 10 is too close to the cut location boundary 85. As an example, an analysis segment being analyzed may be sufficiently flat to permit shifting from low gear to high gear and may be sufficiently long to permit the machine to operate in high gear without flash gear switching. However, if the cut location boundary 85 reduces the distance or time that the machine 10 may operate in high gear before shifting to low gear, the planning system 45 may prevent the upshift to high gear based upon the position of the cut location boundary.

Figure 5:
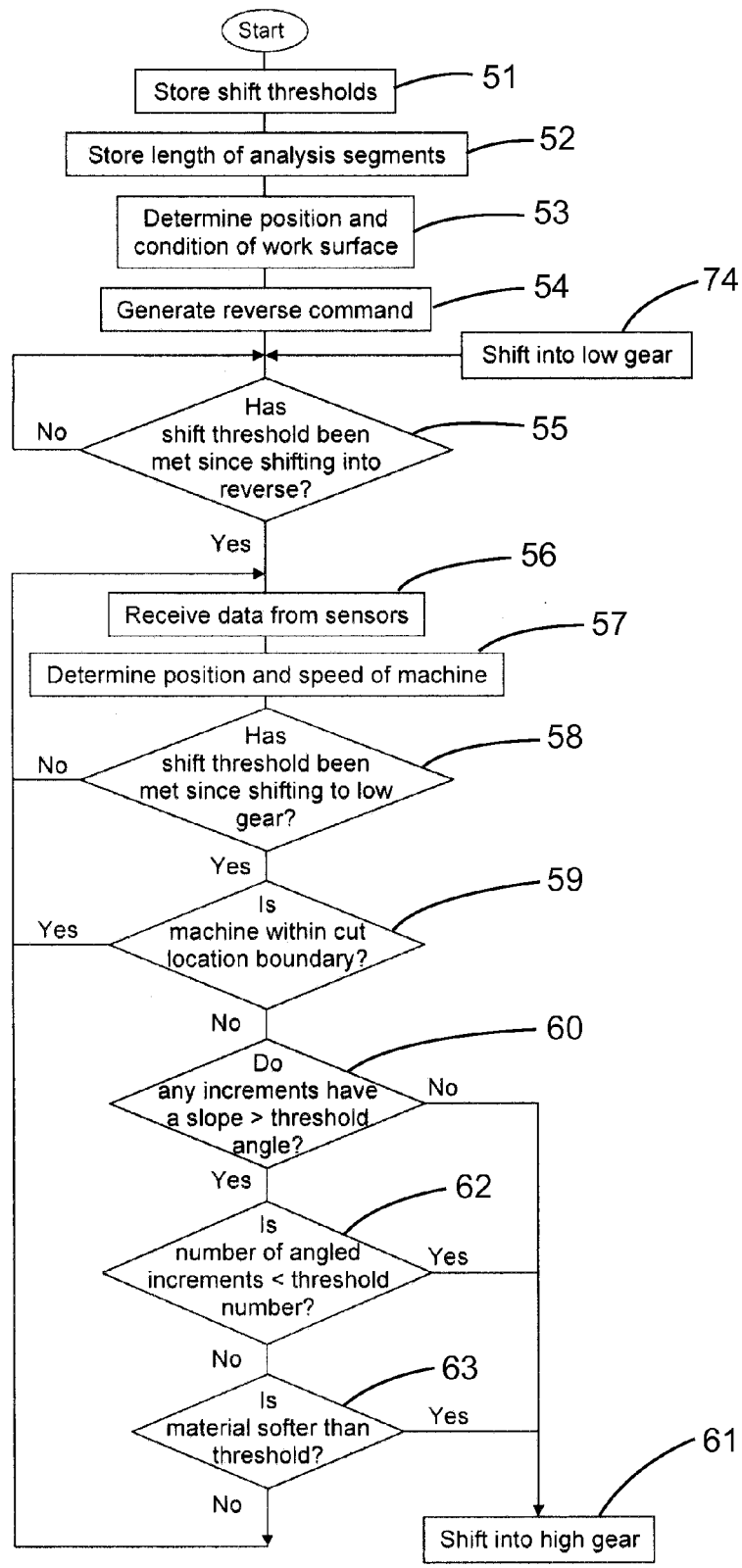
FIG. 5 depicts a flowchart illustrating one aspect of the movement optimization process in accordance with the disclosure.
Figure 6:
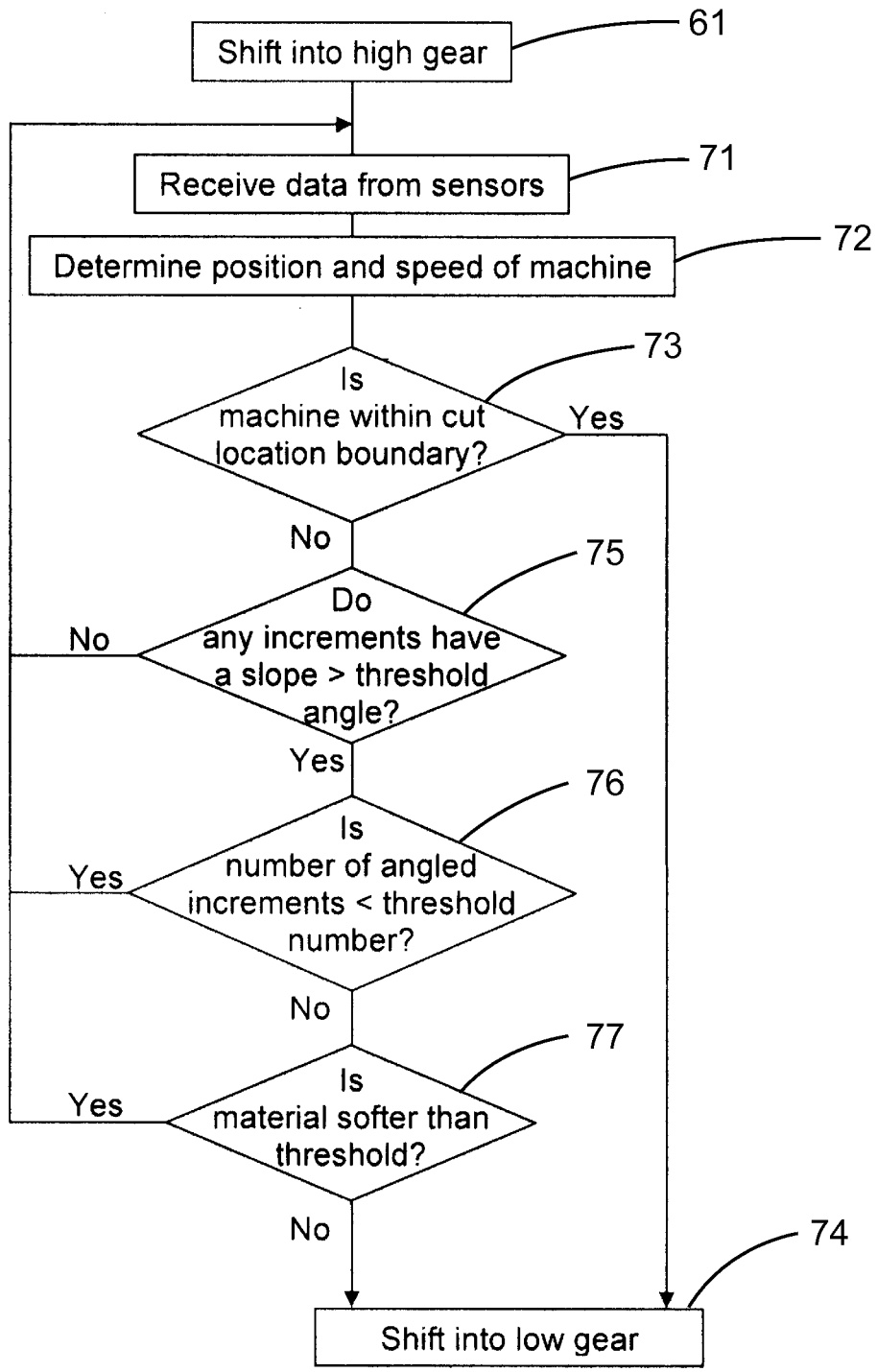
FIG. 6 depicts a second flowchart illustrating another aspect of the movement optimization process in accordance with the disclosure.

The flowcharts in FIGS. 5-6 depict a process in which the planning system 45 may determine optimum locations for shifts in the transmission 14 between low gear and high gear. Referring first to FIG. 5, various shift thresholds may be set or stored at stage 51 in controller 36. In one example, a threshold distance or time may be set or stored that specifies the minimum distance that the machine should travel or time that should elapse after shifting into low gear before shifting into high gear. As an example, a minimum distance may be set at approximately 5 m or time set at approximately 5 seconds. Shorter distances or times may be used for more aggressive operation (i.e., potentially more wear to the transmission 14) and longer distances or times may be used for more conservative operation. In another example, a shift threshold may include the maximum angle of the work surface 104 relative to gravity that the machine 10 may travel while remaining in high gear. In one example, a maximum angle of the work surface 104 relative to gravity may be set at approximately 25°. In another example, a maximum angle may be set at approximately 30°. More aggressive operation would result in the use of a larger angle and more conservative operation would result in the use of a smaller angle. Additional shift thresholds may be set that include a second maximum angle as an exception for a single increment if all of the other increments are less than the maximum angle. Further, the shift thresholds may also include combinations of other angles for increments that are also greater than the maximum angle.

The shift thresholds may be based upon the characteristics of each machine or each type of machine. If desired, the shift thresholds may also take into consideration the material characteristics or hardness of the material 105 that forms the work surface 104.

The length of the analysis segment to be analyzed may be set or stored within controller 36 at stage 52. The length of the analysis segment may be set based upon a distance the machine 10 may travel in a desired period of time to ensure that the machine avoids or minimizes flash gear switching. For example, if it is desired for the machine 10 to travel 5 m before shifting, the planning system 45 should be configured to analyze at least 5 m of the work surface 104 along path 117 uphill from the machine. However, in some instances, it may be desirable to analyze a greater distance along the path 117 and thus the analysis segment may be set to a longer length.

The position of the work surface 104 may be set or stored within controller 36 at stage 53. The position may be determined as the machine 10 moves along the path 117 during a material movement process that moved material 105 generally downhill towards the crest 103. More specifically, as the machine 10 moves material along the path 117, the position of the machine (both horizontally and vertically) may be determined and a topographical map of the path updated. An estimate of the material characteristics of the material 105 may be set or stored in the controller 36 either manually, by an operator or other personnel, or automatically based upon the results of the material movement process.

At stage 54, a command may be generated that causes the transmission 14 of the machine 10 to shift to reverse. At decision stage 55, the controller 36 may determine whether the shift threshold has been met since the transmission 14 was shifted into reverse. If the shift threshold has not been met, the machine 10 will continue to operate in low gear until the shift threshold has been met.

The controller 36 may receive at stage 56 data in the form of signals from the various sensors associated with the machine 10. The controller 36 may use position signals received from the position sensor 28 to determine at stage 57 the position and speed of machine 10.

At decision stage 58, the controller 36 may determine whether the shift threshold has been met since shifting into low gear. In one example, the shift threshold may be the distance traveled by the machine 10 along path 117. In another example, the shift threshold may be the time that the machine has been operating in low gear. If the shift threshold has not been met, the machine 10 will continue to operate in low gear and stages 56-58 repeated.

If the threshold has been met at decision stage 58, the controller 36 may determine at decision stage 59 whether the machine 10 is within the cut location boundary 85. In other words, the controller 36 may determine whether the machine 10 is too close to the next cut location 115 so that a shift from low gear to high gear is undesirable because the transmission 14 will soon need to shift back to low gear to begin the next cut. If the machine 10 is within the cut location boundary 85, the machine may continue to operate in low gear and stages 56-59 repeated.

If the machine 10 is not within the cut location boundary 85, the controller 36 may begin analyzing whether the profile of the path 117 will permit shifting from low gear to high gear without the machine controller 40 downshifting the transmission 14 to low gear before the shift threshold (i.e., distance or time) has passed. To do so, the controller 36 may analyze each of the increments 109 that make up the current analysis segment to determine at decision stage 60 whether any of the increments have a slope that is greater than the threshold angle. If none of the increments 109 have a slope greater than the threshold angle, it is unlikely that the machine 10 will encounter operating conditions that will cause the machine controller 40 to downshift from high gear to low gear. As a result, the planning system 45 may direct the transmission 14 to shift from low gear to high gear at stage 61.

If at least one increment 109 along the analysis segment has a slope greater than the threshold angle, the controller 36 may further analyze at decision stage 62 the increments in terms of the number that exceed the threshold angle and the extent to which they exceed the threshold angle to determine whether the machine controller 40 is likely to direct the transmission 14 to downshift as the machine moves along the analysis segment. In doing so, the controller 36 may analyze the specific configurations of the increments 109 based upon the data from the data maps within the controller. For example, if a single increment 109 has an angle greater than the threshold angle, the planning system 45 may be configured to permit a shift of the transmission 14 into high gear at stage 61 provided that the angle of the increment does not exceed the threshold angle by a predetermined percentage.

If enough increments 109 have an angle greater than the threshold angle at decision stage 62, the controller 36 may analyze the material characteristics of the work surface 104 and determine at decision stage 63 whether the material is softer than a predetermined threshold as specified in the data maps based upon the angles of the increments. If the material is softer than the threshold based upon the angles of the increments 109, the planning system 45 may shift the transmission 14 from low gear to high gear. If the material is not softer than the threshold, the machine 10 may continue to operate in low gear and stages 56-63 repeated.

Referring to FIG. 6, operation of the transmission 14 upon shifting from low gear to high gear at stage 61 is illustrated. The controller 36 may receive at stage 71 data in the form of signals from the various sensors associated with the machine 10. The controller 36 may use position signals received from the position sensor 28 to determine at stage 72 the position and speed of machine 10.

The controller 36 may determine at decision stage 73 whether the machine 10 is within the cut location boundary 85. If the machine 10 is too close to the next cut location 115, it may be desirable to shift the transmission 14 from high gear to low gear at stage 74 so that the transmission 14 has sufficient time after shifting to low gear before beginning the next cut. Accordingly, if the machine 10 is within the cut location boundary 85, the planning system 45 may shift the transmission 14 from high gear to low gear at stage 74.

It should be noted that the shift from high gear to low gear should not have occurred within the shift threshold since shifting from low gear to high gear based upon the analysis performed at decision stage 59 (FIG. 5) before shifting from low gear to high gear. In other words, the operation of decision stage 59 should prevent flash gear switching by preventing shifting from low gear to high gear if the machine 10 is too close to the cut location boundary 85.

If the machine 10 is not within the cut location boundary 85, the controller 36 may begin analyzing whether the profile of the path 117 is likely to cause the machine controller 40 to downshift the transmission 14 to low gear before the shift threshold (i.e., distance or time) has passed. In doing so, the controller 36 may analyze the increments 109 at decision stages 75-77 that correspond to decision stage is 60 and 62-63 of FIG. 5 and the description of decision stages 60 and 62-63 is not repeated herein. The machine 10 may continue to operate in high gear if: 1) the condition of decision stage 75 is not met; 2) the conditions of decision stage 75-76 are met; or 3) the condition of decision stage 75 is met, the condition of decision stage 76 is not met, and the condition of decision stage 77 is met. If, however, the condition of decision stage 75 is met and the conditions of decision stages 76-77 are not met, the planning system may shift the transmission into low gear at stage 74 to avoid flash gear switching.

Upon shifting the transmission 14 into low gear at stage 74, the planning system 45 may continue to operate as illustrated in FIG. 5 at stage 74.

Although described in the context of the machine 10 operating in reverse, the planning system 45 may also operate in a similar manner to control shifting of the transmission 14 and prevent flash gear switching while operating in a forward direction under some circumstances.

INDUSTRIAL APPLICABILITY

The industrial applicability of the control system 35 described herein will be readily appreciated from the forgoing discussion. The foregoing discussion is applicable to machines 10 that move material at a work site 100 regardless of whether they are operating autonomously, semi-autonomously, or manually. Machine 10 may include a planning system 45 that will determine optimum shift locations for the transmission 14 as the machine moves uphill to begin a new cut 114. The optimum shift locations may be based upon a plurality of factors that operate to eliminate or reduce flash gear switching and increase the efficiency of the material movement operation.

Referring to FIG. 4 and moving sequentially uphill in reverse from crest 103 with the planning system 45 operating, the planning system 45 will generate a command to maintain the transmission 14 in low gear from crest 103 until it reaches location 88 at the end of reverse shift threshold depicted at 97. The planning system 45 will then generate a command to shift from low gear to high gear at location 88 and maintain the transmission in high gear until reaching location 86 at which time a downshift command may be generated to shift the transmission from high gear to low gear. The planning system 45 may maintain the transmission 14 in low gear until reaching location 82. Upon reaching location 82, the planning system 45 may generate a command to shift the transmission 14 from low gear to high gear. The transmission 14 may remain in high gear until reaching the cut location boundary 85 which is located a predetermined distance 98 from new cut location 115. At cut location boundary 85, the planning system 45 may generate a command to shift the transmission 14 into low gear prepare the machine 10 for the next cutting operation.

If the planning system 45 were not used, the machine controller 40 would likely shift the transmission 14 from low gear to high gear relatively quickly after the machine 10 begins to move in reverse adjacent crest 103. The transmission 14 would remain in high gear until reaching location 80 and then shift to low gear. The machine 10 would operate in low gear until flash gear switching at location 82 when the machine controller 40 upshifts the transmission to high gear. The machine 10 would operate in high gear and then likely downshift at location 83 until reaching the intersection of portions 92 and 93. At that intersection, the machine controller would likely upshift to high gear (and thus flash gear switching again) and the transmission would remain in high gear until reaching the cut location 115.

Based upon the foregoing, it may be seen that the planning system 45 assists in avoiding flash gear switching and maintaining the transmission 14 in the desired low gear while transitioning from forward to reverse and preparing to transition from reverse to forward.

It will be appreciated that the foregoing description provides examples of the disclosed system and technique. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for determining shift locations of a transmission of a machine as the machine moves on a work surface, comprising:
　a position sensor for generating position signals indicative of a position of the work surface;
　a transmission having a low gear and a high gear;
　a controller including a machine controller, the controller configured to:
　　store a shift threshold;
　　receive the position signals;
　　determine the position of the work surface based upon the position signals;
　　generate an electronic map of the work surface based upon the position of the work surface;
　　generate a shifting plan between the low gear and the high gear based upon the electronic map of the work surface and the shift threshold;
　　the machine controller being configured to control shifting from the high gear to low gear based upon operating parameters of the machine; and
　　control shifting between the low gear and the high gear based upon the shifting plan except when directed by the machine controller to shift from the high gear to the low gear.

2. The system of claim 1, wherein the controller further includes a secondary controller separate from the machine controller, the shift threshold is stored within the secondary controller and the secondary controller is configured to generate the shifting plan to control shifting between the low gear and the high gear based upon the shifting plan.

3. The system of claim 2, wherein the secondary controller is located off-board the machine.

4. The system of claim 2, wherein the secondary controller is located on-board the machine.

5. The system of claim 2, wherein the transmission further includes a forward gear and a reverse gear and the secondary controller is configured to maintain the transmission in the low gear for a reverse shift threshold after shifting the transmission from the forward gear to the reverse gear.

6. The system of claim 2, wherein the transmission further includes a forward gear and a reverse gear and the secondary controller is configured to generate the shifting plan to shift the transmission into the low gear upon the machine reaching a cut location boundary.

7. The system of claim 2, wherein the secondary controller is configured to determine shift locations for the shifting plan based upon a slope of the work surface.

8. The system of claim 7, wherein the secondary controller is configured to divide the electronic map of the work surface into a plurality of increments and determine the shift locations based the slope of the plurality of increments.

9. The system of claim 8, wherein the secondary controller is configured to determine the shift locations based upon material characteristics of the work surface along at least one of the plurality of increments.

10. The system of claim 2, wherein the shift threshold is a minimum time period between shifts and the secondary controller is configured to determine shift locations based on the minimum time period between shifts.

11. The system of claim 2, wherein the shift threshold is a minimum distance between shifts and the secondary controller is configured to determine shift locations based on the minimum distance between shifts.

12. The system of claim 2, wherein the machine controller is configured to control shifts into the low gear and the secondary controller is configured to control shifts out of the low gear.

13. The system of claim 2, wherein the secondary controller is configured to generate the shifting plan to control shifts into and out of the low gear.

14. The system of claim 1, further including a machine speed sensor for generating machine speed signals indicative of a speed of the machine and wherein the machine controller is further configured to receive the machine speed signals, determine the speed of the machine based upon the machine speed signals, and shift from the high gear to the low gear if the speed of the machine is less than a minimum permitted speed.

15. A controller-implemented method of shifting between a low gear and a high gear of a transmission of a machine while the machine is moving on a work surface, comprising:
storing a shift threshold;
receiving position signals indicative of a position of the work surface from a position sensor;
determining the position of the work surface based upon the position signals;
generating an electronic map of the work surface based upon the position of the work surface;
generating a shifting plan between the low gear and the high gear based upon the electronic map of the work surface and the shift threshold;
shifting from the high gear to the low gear based upon operating parameters of the machine; and
shifting between the low gear and the high gear based upon the shifting plan except when shifting from the high gear to the low gear based upon the operating parameters of the machine.

16. The method of claim 15, further including storing the shift threshold within a secondary controller and generating the shifting plan with the secondary controller to control shifting between the low gear and the high gear shifting plan.

17. The method of claim 16, wherein the transmission further includes a forward gear and a reverse gear and further including maintaining the transmission in the low gear for a reverse shift threshold after shifting the transmission from the forward gear to the reverse gear.

18. The method of claim 16, wherein the transmission further includes a forward gear and a reverse gear and further including shifting the transmission into the low gear upon the machine reaching a cut location boundary.

19. The method of claim 16, further including determining shift locations based upon a slope of the work surface.

20. A machine, comprising:
a prime mover;
a ground-engaging drive mechanism operatively connected to the prime mover for propelling the machine along a work surface;
a position sensor for generating position signals indicative of a position of the work surface;
a transmission having a low gear and a high gear;
a controller including a machine controller, the controller configured to:
store a shift threshold;
receive the position signals;
determine the position of the work surface based upon the position signals;
generate an electronic map of the work surface based upon the position of the work surface;
generate a shifting plan between the low gear and the high gear based upon the electronic map of the work surface and the shift threshold;
the machine controller being configured to control shifting from the high gear to the low gear based upon operating parameters of the machine; and
control shifting between the low gear and the high gear based upon the shifting plan except when directed by the main controller to shift from the high gear to the low gear.

* * * * *

UNITED STATES PATENT AND TRADEMARK OFFICE
CERTIFICATE OF CORRECTION

| | | |
|---|---|---|
| PATENT NO. | : 9,523,183 B2 | Page 1 of 1 |
| APPLICATION NO. | : 14/557052 | |
| DATED | : December 20, 2016 | |
| INVENTOR(S) | : Wei et al. | |

It is certified that error appears in the above-identified patent and that said Letters Patent is hereby corrected as shown below:

In the Claims

Column 18, Line 39, In Claim 20, delete "main controller" and insert -- machine controller --.

Signed and Sealed this
Fourth Day of April, 2017

Michelle K. Lee
*Director of the United States Patent and Trademark Office*